United States Patent [19]

Muta et al.

[11] 3,769,049

[45] Oct. 30, 1973

[54] TRANSPARENT SINTERED ALUMINA AND PROCESS FOR PREPARING THE SAME

[75] Inventors: Akinori Muta, Tokyo; Takanobu Noro, Yokohama; Gyozo Toda, Hino; Chieko Yamazaki, Tokorozawa, all of Japan

[73] Assignee: Hitachi, Ltd., Tokyo, Japan

[22] Filed: May 28, 1971

[21] Appl. No.: 148,160

Related U.S. Application Data

[63] Continuation of Ser. No. 799,132, Dec. 23, 1968, abandoned.

[30] Foreign Application Priority Data

Dec. 27, 1967  Japan.................................. 42/83223
Mar. 1, 1968  Japan.................................. 43/12913

[52] U.S. Cl...................... 106/73.4, 106/62, 106/65
[51] Int. Cl............................................. C04b 35/10
[58] Field of Search...................... 106/39 R, 46, 65, 106/73.4; 264/65

[56] References Cited
UNITED STATES PATENTS

| | | | |
|---|---|---|---|
| 3,377,176 | 4/1968 | Wolkodoff et al............ | 106/65 X;46 |
| 3,578,471 | 5/1971 | Lachman ........................... | 106/39 R |
| 2,120,338 | 6/1938 | McDougal et al............. | 106/46;46 X |
| 3,026,210 | 3/1962 | Coble................................ | 106/39 R;39 |
| 2,298,679 | 10/1942 | Christensen ...................... | 106/39 X |
| 2,810,182 | 10/1957 | Brandes............................. | 106/65 X |
| 3,026,177 | 3/1962 | St. Pierre et al.................. | 106/65 X |
| 3,141,786 | 7/1964 | Bugosa............................. | 106/39 X |
| 3,264,124 | 8/1966 | Lauder et al. ................... | 106/65 |
| 3,432,314 | 3/1969 | Mazdiyasni et al.............. | 106/39 X |
| 3,311,482 | 3/1967 | Klingler et al. .................. | 106/65 |
| 1,908,792 | 5/1933 | Ruben............................... | 106/65 X |

FOREIGN PATENTS OR APPLICATIONS

1,027,939  4/1966  Great Britain........................ 106/65

OTHER PUBLICATIONS

Cahoon, H. P., et al.; Sintering & Grain Growth of $\alpha$–Alumina in Journ. Amer. Cer. Soc., 39(1956) pp 337-344. (TP785A62)

Volosevich, et al., in Alumina as a Ceramic Material (1957) (Ed. Gitzen, W); Amer. Cer. Soc. 1967 p 143 & 269 (TP810.05G5).

Ceramic Industry Magazine, Vol. 88 No. 1, Jan. 1967 page 38.

*Primary Examiner*—Helen M. McCarthy
*Attorney*—Craig, Antonelli & Hill

[57] ABSTRACT

Sintered alumina prepared by adding to a high purity alumina powder suitable amounts of magnesium oxide and at least one of cadmium and zinc oxides, and subjecting the mixture to compression-molding and then to sintering at an elevated temperature. The sintered alumina is higher in in-line transmission than sintered alumina prepared without the addition of cadmium or zinc oxide.

4 Claims, 6 Drawing Figures

TRANSPARENT SINTERED ALUMINA AND PROCESS FOR PREPARING THE SAME

This application is a streamlined continuation of Ser. No. 799,132, filed Dec. 23, 1968, which is now abandoned.

This invention relates to substantially pure sintered alumina high in transparency and to a process for preparing the same.

In order to obtain sintered alumina high in transparency, it is of great importance that operations be effected so as to make present little pores in the resulting sintered body. Conventional studies in this field were directed chiefly to the finding of certain second elements which, when added to alumina, could display actions to inhibit the discontinuous grain growth of alumina and to facilitate the escape of pores during the operation of sintering. These kinds of studies have been conducted for a long time and a markedly wide variety of materials such as, for example, oxides or salts of Ba, B, Co, Cu, Fe, Mg, Mn, Ti, Mo, Zr, Y and Zn, were investigated as materials for such second elements as mentioned above.

Recently, there have been developed processes for obtaining sintered alumina relatively high in transparency by compacting a high purity alumina powder incorporated with a small amount of magnesium oxide and then subjecting the compacted powder to sintering at an elevated temperature. These processes are carried out, for example, in the following manner:

1. Fine alumina containing up to 0.5 percent by weight of magnesia is molded, and the molded alumina is pre-sintered for more than an hour in an oxygen-containing atmosphere at 1000°–1700°C. and is then sintered in vacuum or a hydrogen atmosphere at 1700°–1900°C. (U.S. Pat No. 3,026,210).

2. A mixture comprising aluminum sulfate and a magnesium salt convertible to magnesia by thermal decomposition is heated to a temperature up to 1000°C. to form a mixed power comprising magnesia and $\gamma$-alumina, this mixed powder is further heated to convert the $\gamma$-alumina to $\alpha$-alumina and the resulting powder is compression-molded and is then sintered at a temperature within the range of 1700° to 1900°C.

The thus obtained sintered bodies have wide uses as materials for metal gas sealing tubes of high pressure metal vapor discharge lamps, furnace materials, electronics materials, and other heat resisting and corrosion resisting materials.

However, the sintered bodies obtained according to the above-mentioned conventional processes have an in-line transmission of at most about 50 percent. Thus, the conventional processes are not satisfactory in the case where higher transparency is required, or high density, high strength sintered bodies are desired to be obtained, and individually have drawbacks in that extremely high sintering temperatures are required for the preparation of sintered bodies excellent in properties. For example, in order to obtain, according to the conventional processes, sintered bodies having such a high density as more than 98 percent of the theoretical density of alumina, sintering should be effected at temperatures of 1900°C. and above. If sintering is effected at a relatively low temperature, e.g., 1700°C., the in-line transmission of the resulting sintered body is not more than 10 percent.

The in-line transmission is here defined as the ratio of the amount of radiant energy entering a given sample, within a specified entrance steric angle, to the amount of emergent radiant energy contained within a steric angle having the same angular limits as the entrance steric angle.

In the present specification, the in-line transmission value is an averaged value of transmissivity over a wavelength range of 320 – 1100 m$\mu$, through a sample of 0.5 mm thick. It is represented by percentage.

An object of the present invention is to provide a process for preparing sintered alumina higher in transparency than conventional sintered alumina.

Another object is to provide a process in which sintered alumina sufficiently high in density and transparency is obtainable even at a sintering temperature relatively lower than that adopted in the conventional process.

A further object is to provide such sintered alumina as mentioned above.

Other objects will become apparent from the following description.

In accordance with the present invention, there is provided a process for preparing transparent sintered alumina which comprises adding substances capable of inhibiting the grain growth of alumina to a material comprising at least one member selected from the group consisting of high purity alumina and aluminum compounds capable of being converted to high purity alumina by calcination, and then subjecting the mixture to molding and sintering, characterized by using as said additivies a small amount of at least one member selected from the group consisting of zinc oxide, cadmium oxide, zinc compounds convertible to zinc oxide by calcination and cadmium compounds capable of being converted to cadmium oxide by calcination and a small amount of at least one member selected from the group consisting of magnesium oxide and magnesium compounds capable of being converted to magnesium oxide by calcination.

Magnesium oxide employed in the present invention has actions to inhibit the discontinuous grain growth of crystal grains of alumina and to facilitate the removal of pores present in the crystal grains and crystal grain boundary of alumina, thereby densifying the resulting sintered body. The present invention has been established on the basis of the finding that when said magnesium oxide and zinc oxide or cadmium oxide are used in combination, the two compounds synergistically act, even when added in very small amounts, to give excellent polycrystalline sintered alumina.

The magnesium, cadmium and zinc oxides added to alumina individually vaporize, in major proportions, at the sintering stage, and the amount thereof left in the resulting sintered body are no more than trace amounts.

According to the examination carried out by the present inventors, the behaviors of zinc oxide and cadmium oxide at the sintering stage are such that the zinc oxide initiates to vaporize at 1300°C. and, when the temperature reaches 1700°C., almost all of the added zinc oxide terminates the vaporization, while the cadmium oxide begins to vaporize at 1100°C. and, when the temperature becomes 1300°C. or above, almost all of the added cadmium oxide terminates the vaporiation. On the other hand, the alumina is rapidly densified at 1200°–1600°C. to show a high shrinkage. That is, the shrinking step of alumina and the vaporization step of the above-mentioned additives proceed at temperatures within a same range. The role of zinc or cadmium oxide in the above case has not been clarified yet, but is considered ascribable to the fact that the surfaces of alumina crystal grains are activated at the vaporization step of each added oxide.

The present invention will be detailed below with reference to the accompanying drawings.

Alumina employed in the present invention is preferably as pure and as fine in particle size as possible. Ordinarily, alumina having a particle size of $0.1 - 0.4 \mu$ is used. Particularly when heat resistance, corrosion resistance to metal vapor, or the like is taken into consideration, it is desirable to use alumina containing silicon in an amount as small as possible. In place of alumina, an aluminum compound capable of being converted to $\alpha$-alumina by calcination, such as aluminum sulfate, may be used to obtain substantially same results.

In mixing alumina with the aforesaid additives, it is preferable that soluble compounds such as hydrochlorides, hydrofluorides or carbonates of magnesium and zinc or cadmium, which are capable of being finally converted to oxides of said metals by calcination, be used and the mixing be effected according to wet method. However, it is also effective to mix from the beginning powders of magnesium and zinc or cadmium oxides according to dry or wet method under such conditions that alumina is miscible therewith sufficiently homogeneously.

The drying of a mixture formed by mixing alumina with the additives according to wet method is effected in such a manner that a major proportion of the solvent is vaporized by stirring the mixture at normal temperature, and then volatile matters are completely removed in an air bath kept at 100°–120°C.

Compacting pressure at the compacting step is not particularly restricted but is preferably about 1–3 $t/cm^2$.

Presintering is effected under such temperature, atmosphere and heating conditions that individual components can be completely converted to the form of oxides. Generally, it is sufficient to heat the mixture in air at a temperature of 1000°–1600°C. for more than 5 minutes.

Machining is effected, as occasion demands, in the case where a particularly precise dimension is required or in the case where the molded body has been greatly deformed during the course of presintering.

Sintering is carried out at a temperature within the range of 1600° to 1950°C. in such a reducing atmosphere that oxygen-wanting lattice defect is liable to be introduced into alumina crystals, or in such a vacuum that pores in the crystal grains can easily escape out of the crystals. The lower the sintering temperature, the longer the sintering time. That is, in case the sintering is effected at such a relatively low temperature as about 1600°C., a sintering time of more than several hours is required, whereas in case the sintering is effected at above 1900°C., it is sufficient to carry out heating for more than 5 minutes. Ordinarily, it is desirable that the sintering be effected at 1700° – 1900°C. for 2–5 hours.

Figure 1:
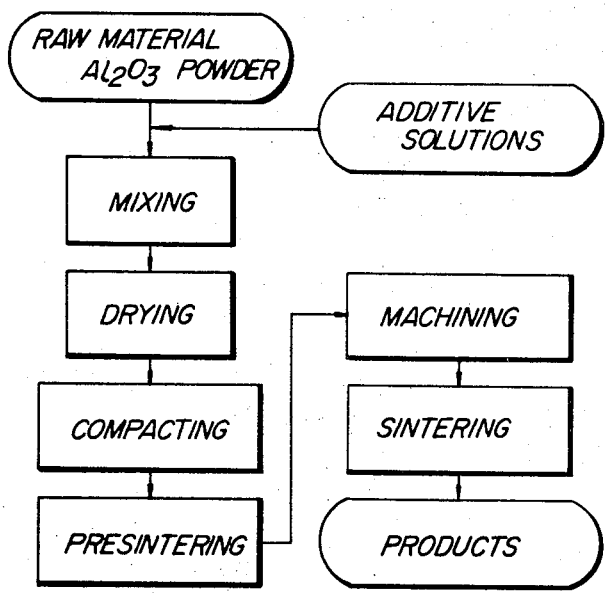
FIG. 1 is a flow sheet showing an example of steps for the preparation of transparent sintered alumina according to the present invention.
Figure 2:
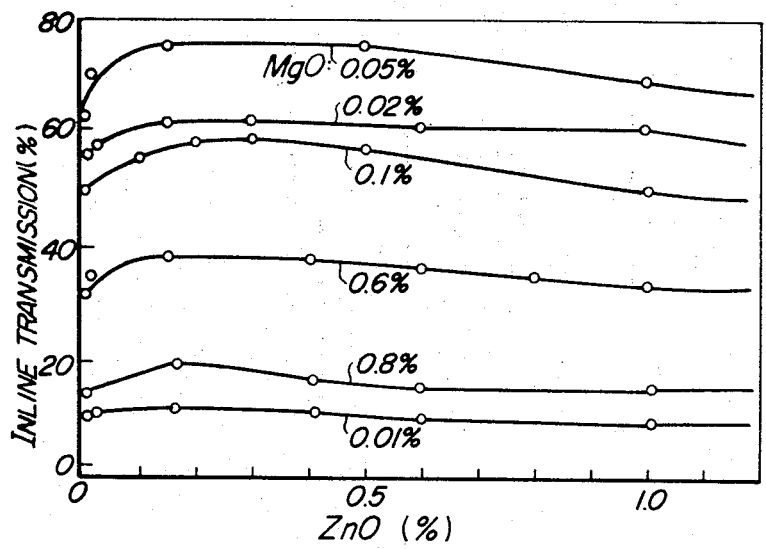
FIG. 2 is a graph showing the relationship between the in-line transmission of sintered bodies obtained by practice of the present invention and the amounts of zinc and magnesium oxides added to alumina.

The present invention will be illustrated with reference to the following embodiments:

I. Relationship between the amounts of zinc, cadmium and magnesium oxides added and the transparency of sintered body:

FIG. 2 shows the results obtained in the case where the amount of magnesium oxide was varied from 0.01 to 0.8 percent; the amount of zinc oxide added was varied from 0 to 1.0 percent; and the sintering was effected in hydrogen at 1900°C. for 2 hours. According to the above results, it is understood that in case the amount of magnesium oxide added is in the range of 0.02 to 0.8 percent, the higher in-line transmission is observed at a portion where zinc oxide is added in an amount of from 0.05 to 0.5 percent than that of other portions. Thus, it is clear that in accordance with the present invention, there is obtained a sintered body which is about 6–12 percent higher in in-line transmission than in the case where no zinc oxide is added, i.e., in the case where only magnesium oxide is added, like in the conventional process.

The steps for preparing the sintered body in the embodiment shown in FIG. 2 was as follows:

To high purity fine alumina having an average particle diameter of about 0.3 $\mu$ were added aqueous solutions of zinc chloride and magnesium chloride in such amounts that given amounts of individual metals calculated for oxides had been contained therein. The resulting mixture was thoroughly stirred to form a homogeneous slurry, was dried in an air bath at about 100°C., and was then press-molded under a pressure of $2t/cm^2$. Subsequently, the molded body was presintered in air at 1100°C. for 1 hour, and was then sintered in hydrogen at 1900°C. for 2 hours. The line shrinkage of the molded body was 2–3 percent at the presintering step and was 18–20 percent at the sintering step. The thus obtained plate-like, transparent, sintered alumina was abraded to a thickness of 0.5 mm. and was used to measure the in-line transmission thereof.

Figure 3:
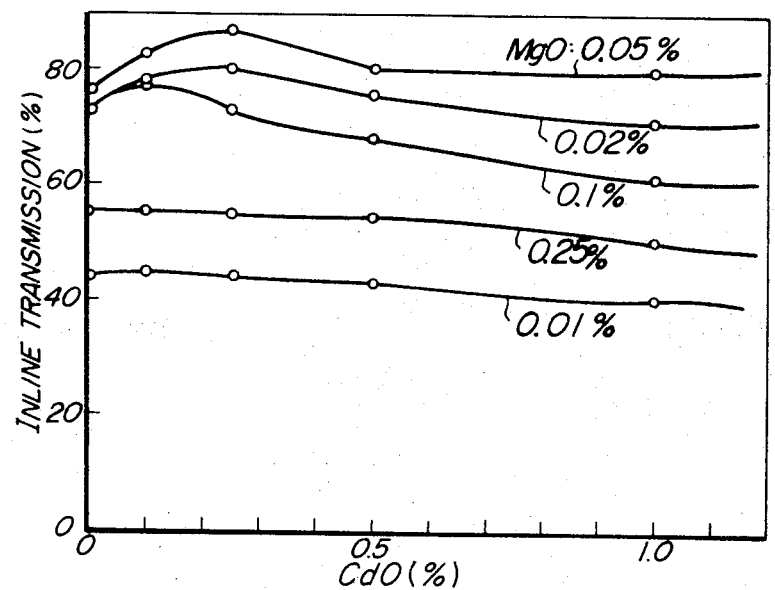
FIG. 3 is a graph showing the relationship between the in-line transmission of sintered bodies obtained by practice of the present invention and the amounts of cadmium and magnesium oxides added to alumina.

FIG. 3 shows the relationship between the in-line transmission and the composition of starting powdery mixture of sintered bodies when the amounts of magnesium oxide and cadmium oxide were varied from 0.01 to 0.25 percent and from 0 to 1.0 percent, respectively. From FIG. 3, it is understood that in case the amount of magnesium oxide added is less than 0.01 percent or more than 0.25 percent, the value of in-line transmission is in the order of about 50 percent but the effect due to the addition of cadmium oxide is rather negative. It may therefore be said that in the case of combination use of cadmium oxide and magnesium oxide, the effective amount of cadmium oxide to be added to alumina is from 0.05 to 0.5 percent and that of magnesium oxide is up to 0.1 percent.

The steps for production of the above-mentioned sintered alumina was substantially identical with that in the case of the aforesaid alumina-magnesium oxide-zinc oxide system, except that the average particle diameter of starting alumina was 0.08 $\mu$. The reason why the sintered alumina shown in FIG. 3 is higher in transmission than that in FIG. 2 is considered ascribable to said difference in average particle diameter of starting alumina. The above fact obviously indicates that only when zinc oxide and magnesium oxide or cadmium oxide and magnesium oxide are used in combination, there is brought about a certain synergistic action capable of giving effective results.

II. Relationship between the sintering time and the in-line transmission of sintered body:

In practicing the present invention, the sintering time greatly affects the in-line transmission of product.

Figure 4:
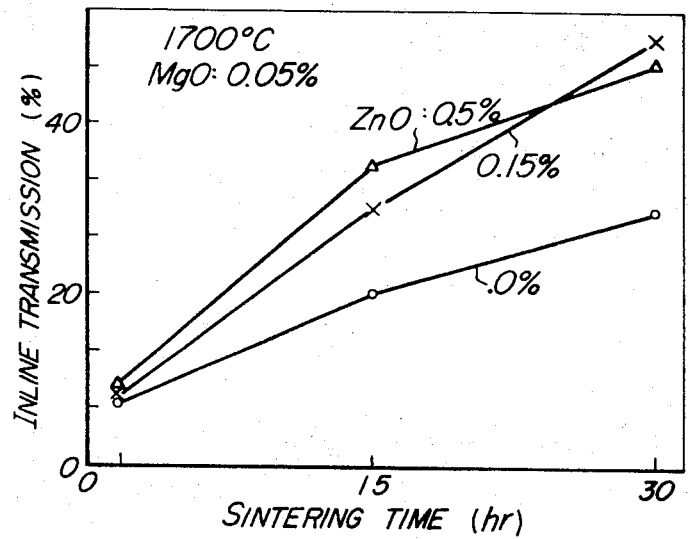
FIG. 4 is a graph showing the relationship between the sintering time required for the preparation of sintered bodies according to the present invention and the in-line transmission of the sintered bodies.

FIG. 4 shows the relationship between the sintering time and the in-line transmission of sintered bodies obtained, according to the same procedures as in the above-mentioned embodiments, by adoption of such conditions that the sintering temperature was 1700°C., the amount of magnesium oxide was 0.05 percent, and the amount of zinc oxide was varied to 0 percent, 0.5 percent and 0.15 percent.

From FIG. 4, it is understood that when the sintering temperature is about 1700°C., the longer the sintering time, the more increased the in-line transmission of the sintered body in every case where the amount of zinc oxide is varied to 0 percent, 0.5 percent and 0.15 percent, and that the rate of increase in transmission is higher in the two cases where zinc oxide is added than in the case no zinc oxide is added. Substantially the same results as above are obtained in the case where cadmium oxide is added in place of zinc oxide.

Concerning the relationship between the sintering temperature and the sintering time, the present inventors made studies to find that at a temperature up to 1900°C., the longer the sintering time, the higher the in-line transmission of the sintered body, like in the above case, so far as the sintering time is within the range of 30-40 hours.

Figure 5:
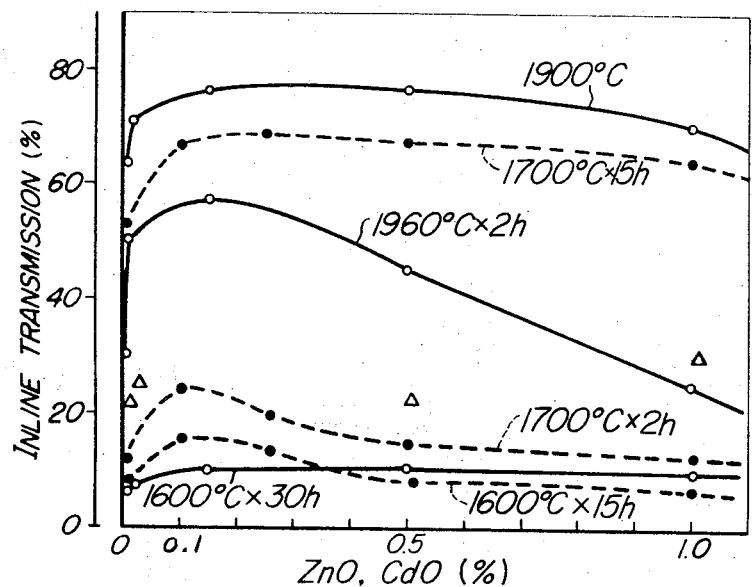
FIG. 5 is a graph showing the relationship between the in-line transmission of sintered bodies obtained by the practice of the present invention, the amounts of zinc and cadmium oxides added to alumina, and the sintering conditions employed.

III. Relationship between the sintering temperature and the in-line transmission of sintered body:

FIG. 5 shows the results of examination of influence, on in-line transmission of sintered body, of the amount of zinc oxide or cadmium oxide added and the sintering temperature.

In FIG. 5, curves shown by solid lines indicate individually the relationship between the amount of zinc oxide added and the in-line transmission of sintered body in the cases where sintering was effected in a hydrogen atmosphere under such conditions as 1900°C. for 2 hours, 1960°C. for 2 hours, and 1600°C. for 30 hours, respectively. The above results indicate that at a sintering temperature above about 1960°C., the in-line transmission of sintered body becomes lower than in the case where the sintering temperature is 1900°C., and that when the amount of zinc oxide added is more than 0.3 percent, the said in-line transmission is rapidly lowered. The above phenomenon is considered ascribable to the fact that the action of melting point depression due to addition of zinc oxide is strongly displayed. From every result, however, it is clear that the addition of zinc oxide has marked effect on the in-line transmission of sintered body, so far as the case where zinc oxide is added is compared with the case where it is not added.

In FIG. 5, curves shown by dotted lines indicate individually the relationship between the amount of cadmium oxide added and the in-line transmission of sintered body in the cases where sintering was effected in a hydrogen atmosphere under such conditions as 1700°C. for 2 hours, 1700°C. for 15 hours, and 1600°C. for 15 hours. From the above results, it is understood that so far as the in-line transmission of a practical sintered body is deemed to be more than 10 percent, a sufficiently practical sintered body can be obtained in accordance with the present invention even at such a relatively low temperature as about 1600°C., if sintering is effected for such a sufficiently long period of time as about 15 hours or more. It is also understood that the longer the sintering time, the higher the in-line transmission of sintered body, as is clear from a comparison between the case where sintering was effected at 1700°C. for 2 hours and the case where sintering was effected at said temperature for 15 hours.

Further, in FIG. 5, plotted points bearing the mark $\Delta$ individually show examples of cases where, in the sintering step, the temperature was elevated to 1900°C. and was simultaneously lowered. In each of the above cases, the time employed for sintering is substantially zero, but the resulting sintered body has an in-line transmission of a certain extent due to heating during the course of temperature elevation. Even when a high sintering temperature is employed, however, the properties of sintered body become greatly uneven, if the sintering time is excessively short. It is therefore desirable that after the temperature has been elevated to a given temperature, said given temperature should be maintained for at least 5 minutes.

Figure 6:
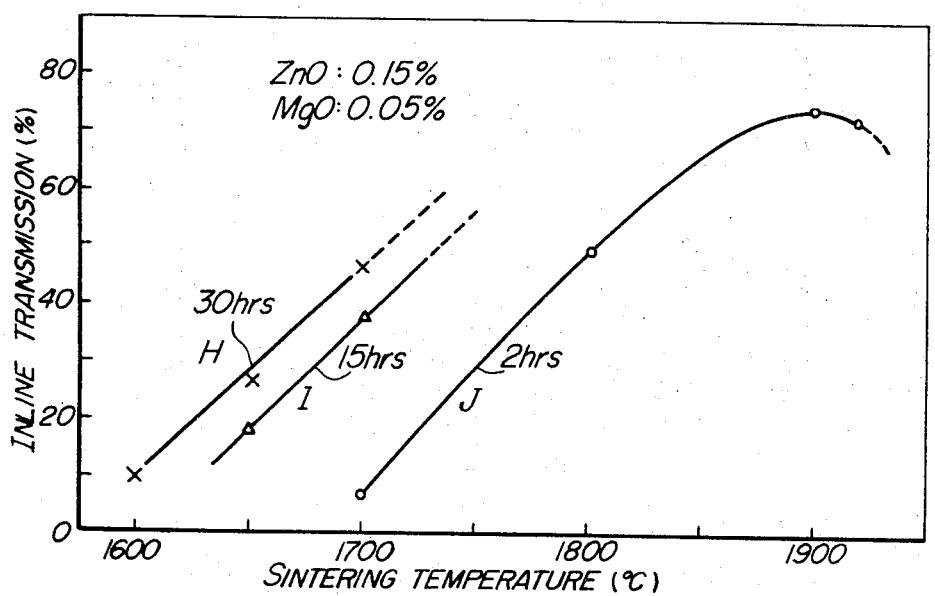
FIG. 6 is a graph showing the relationship between the in-line transmission of sintered bodies obtained by practice of the present invention and the sintering temperature and the sintering time employed.

FIG. 6 shows the results of examination of the relationship between the sintering temperature and the in-line transmission of sintered body. Samples employed in the embodiment shown in FIG. 6 contained 0.15 percent of zinc oxide and 0.05 percent of magnesium oxide. Curves shown in FIG. 6 individually indicate the results obtained in the cases where the sintering time was varied to 30 hours, 15 hours and 2 hours, respectively. From the above results, it is understood that when the sintering temperature is 1600°C., a sintering time of about 30 hours or more is required in order to obtain a sintered body having an in-line transmission of about 10 percent, and that if the sintering temperature is 1700°C., a sintering time of 2 hours is sufficient. Further, there is observed such a tendency that if the sintering temperature is above 1950°C., a sintering time of 2 hours is rather long. Such a tendency as above is observed also in the case where cadmium oxide is used in place of zinc oxide, as has partly been clarified in the explanation concerning the results shown in FIG. 5.

Tables 1 and 2 set forth below show the in-line transmission values of sintered bodies obtained in the cases where aluminum sulfate was used as starting material in place of alumina.

Table 1

| Amount of ZnO added (%) | 0 | 0.1 | 0.25 | 0.5 | 1.0 |
|---|---|---|---|---|---|
| In-line transmission (%) | 76 | 79 | 82 | 77 | 75 |

Table 2

| Amount of CdO added (%) | 0 | 0.1 | 0.25 | 0.5 | 1.0 |
|---|---|---|---|---|---|
| In-line transmission (%) | 73 | 78 | 80 | 76 | 71 |

In case aluminum sulfate or the like material capable of being converted to alumina by calcination is used as starting material in place of alumina, a powder of aluminum sulfate or the like material is mixed with additives in a wet state, and the mixutre is thoroughly stirred and is heated to 100°–120°C. while continuing the stirring to dry the mixture. Subsequently, the mixture is heated to 1000°–1100°C. to form a mixed powder comprising γ-alumina, zinc oxide and magnesium oxide, or γ-alumina, cadmium oxide and magnesium oxide, and is further heated to 1300°C. to form a mixed powder comprising α-alumina, zinc oxide and magnesium oxide, or α-alumina, cadmium oxide and magnesium oxide. Steps of molding and sintering the thus formed mixture are the same as in any of the preceding embodiments. In each of the embodiments shown in Tables 1 and 2, the amount of magnesium oxide added was 0.05 percent, the presintering was effected in air under conditions of 1200°C. for 1 hour, and the sintering was effected in hydrogen under conditions of 1900°C. for 2 hours. According to the above embodiments, the in-line transmission values of sintered bodies are similar to those in the embodiments shown in FIGS. 2 and 3. It is thus evident that even when a material capable of being converted to alumina by calcination is used as starting material in place of alumina, the effect due to addition of zinc oxide or cadmium oxide can be markedly displayed.

All of the above-mentioned embodiments show the cases where the sintering was effected in a hydrogen atmosphere. Even when the sintering is effected in vacuum, however, the same transparent sintered alumina as in the above embodiments can be obtained.

Table 3 set forth below shows the in-line transmission values of sintered bodies obtained by adding 0.05 percent of magnesium oxide and 0–1.0 percent of zinc oxide to fine alumina having an average particle diameter of 0.5 μ and subjecting the mixture to sintering in vacuum.

Table 3

| Amount of ZnO added (%) | 0 | 0.1 | 0.25 | 0.5 | 1.0 |
|---|---|---|---|---|---|
| In-line transmission (%) | 60 | 65 | 66 | 62 | 58 |

In the above embodiment, the steps for production of sintered bodies were the same as in each of the aforesaid embodiments, and the sintering temperature and time were 1900°C. and 2 hours, respectively.

From Table 3, it is clear that when sintering is effected in vacuum, the in-line transmission of sintered body somewhat lowers in practice, but it is possible to obtain a sintered body having sufficiently high transparency for practical use.

From the above embodiments, the following matters may be concluded with respect to the present invention.

1. When zinc oxide is added as a third additive to a known alumina-magnesium oxide system, sintered alumina more excellent in transparency than conventional sintered alumina is obtained. Such excellent transparency is ascribable to a synergistic action due to the combination use of magnesium oxide and zinc oxide.

In the above case, the effective amount of magnesium oxide is up to 0.8 percent, and that of zinc oxide is 0.01 – 1.0 percent. Sintering temperature is 1600°C. – 1950°C. The effect of zinc oxide addition is most greatly displayed under sintering conditions of 1700°C. × 15 to 30 hours. In this case, the in-line transmisison of sintered body is 35–45 percent, and is about 15 percent higher than that of sintered body obtained without the addition of zinc oxide.

2. When cadmium oxide is added as a third additive to a known alumina-magnesium oxide system, sintered alumina more excellent in transparency than conventional sintered alumina is obtained. Such excellent transparency is ascribable to a synergistic action due to the combination use of magnesium oxide and cadmium oxide, like in the case where zinc oxide is added to a known alumina-magnesium oxide system. In the above case, the effective amount of magnesium oxide is up to 0.1 percent, and that of cadmium oxide is up to 1.0 percent. Sintering temperature is preferably 1600°C. – 1950°C. The effect of cadmium oxide addition is most greatly displayed under sintering conditions of 1600°C. – 1700°C. × 2–15 hours. In this case, the in-line transmission of sintered body is about 15 percent higher than that of sintered body obtained without the addition of cadmium oxide.

3. In the above, the fact that a sintered body higher in transparency than a conventional sintered body is obtained shows that a sintered body, which is more dense and is less in pores, can be obtained. This indicates that sintered alumina obtained by practice of the present invention can display excellent properties not only in transparency but also in mechanical strength, heat resistance and corrosion resistance, when it is used as a material for various discharge lamps or for furnaces.

Further, the fact that a sintered body relatively high in in-line transmission can be obtained even at such a relatively low sintering temperature as 1600° – 1700°C. is a great merit in producing sintered bodies at present when a large sintering furnace capable of generating such a high temperature as 1900°C. or above is difficultly obtainable.

We claim:

1. A process for preparing a transparent sintered alumina body having an in-line transmission of not less than 10 percent per 0.5 millimeter thickness for radiant energy of all wavelengths from about 0.32 to 1.1 micron which comprises the steps of:

a. preparing a homogeneous mixture consisting of at least one member selected from the group consisting of high purity fine alumina and aluminum compounds capable of being converted to alumina by calcination in an oxidizing atmosphere, said alumina having an average particle size of from about 0.1–0.5 micron at least one member selected from the group consisting of from 0.1 to 0.5 weight percent of zinc oxide and zinc compounds capable of being converted to zinc oxide by calcination in an oxidizing atmosphere, the amount of said zinc compounds being sufficient to produce said amount of zinc oxide, and at least one member selected from the group consisting of 0.05 weight percent of magnesium oxide and magnesium compounds capable of being converted to magnesium oxide by calcination in an oxidizing atmoshpere, the amount of said magnesium compounds being sufficient to produce said amount of magnesium oxide, b. press-molding said mixture, c. presintering the molded product in an oxidizing atmosphere at a temperature of 100°C to 1600°C for not less than about 30 minutes, and d. sintering the presintered product in an environment selected from the group consisting of hydrogen and a vacuum at a temperature from 1650°C to 1950°C for a period of time ranging from that sufficient to produce a sintered body having said in-line transparency and not less than 5 minutes, thereby increasing the in-line transmission of the sintered alumina body above that obtained in the absence of zinc oxide.

2. The process according to claim 1, wherein the amount of zinc oxide in weight percent is 0.25.

3. A process for preparing a transparent sintered alumina body having an in-line transmission of not less than 10 percent per 0.5 millimeter thickness for radiant energy of all wavelengths from about 0.32 to 1.1 micron which comprises the steps of:

a. preparing a homogeneous mixture consisting of at least one member selected from the group consisting of high purity fine alumina and aluminum compounds capable of being converted to alumina by calcination in an oxidizing atmosphere, said alumina having an average particle size of from about 0.1 – 0.5 micron, at least one member selected from the group consisting of from 0.1 to 0.5 weight percent of cadmium oxide and cadmium compounds capable of being converted to cadmium oxide by calcination in an oxidizing atmosphere, said amount of cadmium compounds being sufficient to produce said amount of cadmium oxide, and at least one member selected from the group consisting of 0.05 weight percent of magnesium oxide and magnesium compounds capable of being converted to magnesium oxide by calcination in an oxidizing atmosphere, said amount of magnesium compounds being sufficient to produce said amount of magnesium oxide, b. press-molding said mixture, c. presintering the molded product in an oxidizing atmosphere at a temperature of 1000°C to 1600°C for not less than about 30 minutes, and d. sintering the presintered product in an environment selected from the group consisting of hydrogen and a vacuum at a temperature of from 1650°C–1950°C for a period of time ranging from that sufficient to produce sintered body having said in-line transparency and not less than 5 minutes, thereby increasing the in-line transmission of the sintered alumina body above that obtained in the absence of cadmium oxide.

4. The process according to claim 3, wherein the weight percent of cadmium oxide is 0.25.

* * * * *